(12) United States Patent
Chen et al.

(10) Patent No.: US 10,158,428 B2
(45) Date of Patent: Dec. 18, 2018

(54) METHOD AND APPARATUS FOR DIGITALLY AND AUTOMATICALLY CONTROLLING A BIAS VOLTAGE OF ELECTRO-OPTIC OPTICAL MODULATOR

(71) Applicant: PLUGTECH PRECISION SYSTEMS LIMITED (SHENZHEN), Shenzhen (CN)

(72) Inventors: Yuqi Chen, Shenzhen (CN); Bing Fang, Shenzhen (CN); Yongzhan Zhao, Shenzhen (CN)

(73) Assignee: PLUGTECH PRECISION SYSTEMS LIMITED (SHENZHEN), Shenzhen (CN)

( * ) Notice: Subject to any disclaimer, the term of this patent is extended or adjusted under 35 U.S.C. 154(b) by 0 days.

(21) Appl. No.: 15/675,780

(22) Filed: Aug. 13, 2017

(65) Prior Publication Data

US 2017/0359122 A1 Dec. 14, 2017

Related U.S. Application Data

(63) Continuation of application No. PCT/CN2016/072189, filed on Jan. 26, 2016.

(30) Foreign Application Priority Data

Feb. 14, 2015 (CN) .......................... 2015 1 0083454

(51) Int. Cl.
*G02F 1/01* (2006.01)
*G05F 1/46* (2006.01)
(Continued)

(52) U.S. Cl.
CPC ....... *H04B 10/2575* (2013.01); *G02F 1/0115* (2013.01); *G05F 1/46* (2013.01);
(Continued)

(58) Field of Classification Search
CPC ... G02F 1/0115; G05F 1/46; H04B 10/07955; H04B 10/2504; H04B 10/2575; H04B 10/516
(Continued)

(56) References Cited

U.S. PATENT DOCUMENTS 6,046,838 A 4/2000 Kou et al.
6,317,247 B1 * 11/2001 Yang ..................... G02F 1/0123
359/239
(Continued)

FOREIGN PATENT DOCUMENTS

CA 2520633 C 10/2004
CN 1450382 A 10/2003
(Continued)

OTHER PUBLICATIONS

International Search Report dated Apr. 22, 2016; PCT/CN2016/072189.

*Primary Examiner* — Amritbir K Sandhu
(74) *Attorney, Agent, or Firm* — Na Xu; IPro, PLLC (57) ABSTRACT

A method and an apparatus for digitally and automatically controlling a bias voltage of an electro-optic optical modulator are disclosed. The method includes: outputting a scanning bias voltage; acquiring a first optical signal; converting the first optical signal into a first electrical signal; outputting a first direct current signal; calculating an operating bias voltage at each operating point and a half-wave voltage; calculating an error feedback coefficient and a dither amplitude; outputting an operating bias voltage and a dither signal with the dither amplitude; acquiring a second optical signal; converting the second optical signal into a second electrical signal; outputting a harmonic component; calculating a
(Continued)

harmonic amplitude and a shift phase; calculating a new bias voltage; and using the new bias voltage as the operating bias voltage.

10 Claims, 6 Drawing Sheets

(51) Int. Cl.
    *H04B 10/25*     (2013.01)
    *H04B 10/079*     (2013.01)
    *H04B 10/516*     (2013.01)
    *H04B 10/2575*     (2013.01)

(52) U.S. Cl.
    CPC ... *H04B 10/07955* (2013.01); *H04B 10/2504* (2013.01); *H04B 10/516* (2013.01)

(58) Field of Classification Search
    USPC .......................................... 398/182, 195, 198
    See application file for complete search history.

(56) References Cited

U.S. PATENT DOCUMENTS

| | | | |
|---|---|---|---|
| 7,672,033 B2* | 3/2010 | Kobayashi | G02F 1/0327 359/238 |
| 8,532,499 B2* | 9/2013 | Caton | H04B 10/5051 359/245 |
| 2003/0112487 A1* | 6/2003 | Fuller | H04B 10/5051 359/239 |
| 2003/0175037 A1* | 9/2003 | Kimmitt | G02F 1/0123 398/198 |
| 2003/0210914 A1* | 11/2003 | Khayim | H04B 10/505 398/197 |
| 2007/0019968 A1 | 1/2007 | Hashimoto et al. | |
| 2010/0119239 A1* | 5/2010 | Wang | H04B 10/50575 398/198 |
| 2014/0168741 A1* | 6/2014 | Li | G02F 1/0123 359/239 |
| 2014/0334829 A1* | 11/2014 | Akiyama | G02F 1/0123 398/186 |
| 2017/0359122 A1* | 12/2017 | Chen | G05F 1/46 |
| 2018/0123698 A1* | 5/2018 | Chen | H04B 10/556 |

FOREIGN PATENT DOCUMENTS

| | | |
|---|---|---|
| CN | 1764864 A | 4/2006 |
| CN | 101859156 A | 10/2010 |
| CN | 102722204 A | 10/2012 |
| CN | 103019286 A | 4/2013 |
| CN | 104699155 A | 6/2015 |
| EP | 1380874 A1 | 1/2004 |
| EP | 2148235 A1 | 1/2010 |
| JP | 2003295138 A | 10/2003 |
| JP | 2004117729 A | 4/2004 |
| JP | 2004318052 A | 11/2004 |
| JP | 2010243953 A | 10/2010 |
| JP | 2011217003 A | 10/2011 |
| WO | 2004088397 A1 | 10/2004 |
| WO | 2013114628 A1 | 5/2015 |

\* cited by examiner

METHOD AND APPARATUS FOR DIGITALLY AND AUTOMATICALLY CONTROLLING A BIAS VOLTAGE OF ELECTRO-OPTIC OPTICAL MODULATOR

CROSS-REFERENCE TO RELATED APPLICATIONS

This application is a continuation of International Application No. PCT/CN2016/072189, with an international filing date of Jan. 26, 2016, which is based upon and claims priority to Chinese Patent Application No. 201510083454.4, filed on Feb. 14, 2015, the entire contents of which are incorporated herein by reference.

TECHNICAL FIELD

The present disclosure relates to the technical field of optical processing, and in particular, relates to a method and an apparatus for digitally and automatically controlling a bias voltage of an electro-optic optical modulator.

BACKGROUND

An optical modulator is used to modulate radio frequency signals onto an optical carrier output by a laser to form optical signals, wherein the optical modulator is widely applied in the fields of optical fiber communication and optical fiber sensing. An output curve of the optical signals modulated by the optical modulator has a waveform of a cosine function shape. To control the optical modulator at different working points, a bias voltage may be output to the optical modulator.

However, since the optical modulator is extremely sensitive to changes of the working environment, such as changes of temperature, changes of humidity, mechanical vibration and the like. Due to the changes of the working environment, the output curve of the optical modulator is shifted, and thus the working points are shifted, so the normal operation of the optical modulator at different working points may not be ensured. Therefore, bias voltages applied to the optical modulator needs to be changed based on the changes of the environment, which is referred to as the bias voltage control technology.

In the prior art, the bias voltage control technology is developed mainly based on the solution of analog circuits. The essence thereof lies mainly in that when a bias voltage is output, a dither signal is simultaneously output, and the working point of the optical modulator is slightly adjusted according to the dither signal.

SUMMARY

An embodiment of the present disclosure provides a method for digitally and automatically controlling a bias voltage of an electro-optic optical modulator. The method includes:
  outputting a scanning bias voltage to an optical modulator;
  acquiring a first optical signal output upon modulation by the optical modulator according to the scanning bias voltage;
  converting the first optical signal into a first electrical signal;
  filtering the first electrical signal using a first filter, so as to output a first direct current signal;
  calculating an operating bias voltage at each operating point and a half-wave voltage of the optical modulator according to the first direct current signal;
  calculating an error feedback coefficient and a dither amplitude of a dither signal according to the half-wave voltage;
  outputting an operating bias voltage and a dither signal with the dither amplitude to the optical modulator;
  acquiring a second optical signal output upon modulation by the optical modulator according to the operating bias voltage and the dither signal;
  converting the second optical signal into a second electrical signal;
  filtering the second electrical signal using a second filter, so as to output a harmonic component;
  calculating a harmonic amplitude and a shift phase of the harmonic component;
  calculating a new bias voltage according to the shift phase in combination with the error feedback coefficient, the operating bias voltage and the harmonic amplitude; and
  using the new bias voltage as the operating bias voltage, and returning to the step of outputting an operating bias voltage and a dither signal with the dither amplitude to the optical modulator.

Another embodiment of the present disclosure provides an apparatus for digitally and automatically controlling a bias voltage of an electro-optic optical modulator. The apparatus includes:
  a first outputting module, configured to output a scanning bias voltage to an optical modulator;
  a first acquiring module, configured to acquire a first optical signal output upon modulation by the optical modulator according to the scanning bias voltage;
  a first optical-electrical converting module, configured to convert the first optical signal into a first electrical signal;
  a first filter module, configured to filter the first electrical signal using a filter, so as to output a first direct current signal;
  a first calculating module, configured to calculate an operating bias voltage at each operating point and a half-wave voltage of the optical modulator according to the first direct current signal;
  a second calculating module, configured to calculate an error feedback coefficient and a dither amplitude of a dither signal according to the half-wave voltage;
  a second outputting module, configured to output an operating bias voltage and a dither signal with the dither amplitude to the optical modulator;
  a second acquiring module, configured to acquire a second optical signal output upon modulation by the optical modulator according to the operating bias voltage and the dither signal;
  a second optical-electrical converting module, configured to convert the second optical signal into a second electrical signal;
  a second filter module, configured to filter the second electrical signal, so as to output a harmonic component;
  a digital lock-in amplifying module, configured to calculate a harmonic amplitude and a shift phase of the harmonic component;
  a third calculating module, configured to calculate a new bias voltage according to the shift phase in combination with the error feedback coefficient, the operating bias voltage and the harmonic amplitude; and a value assigning module, configured to use the new bias voltage as the operating bias voltage, and return to the second outputting module.

Still another embodiment of the present disclosure provides an apparatus for digitally and automatically controlling a bias voltage of an electro-optic optical modulator. The apparatus includes:

an optical-electrical converter, a filter, a digital lock-in amplifier, a processor, and an output device;

the output device inputs a scanning bias voltage to an optical modulator; an optical fiber splitter acquires a first optical signal output upon modulation by the optical modulator according to the scanning bias voltage, and inputs the first optical signal to the optical-electrical converter;

the optical-electrical converter converts the first optical signal into a first electrical signal;

the filter filters the first electrical signal, so as to output a first direct current signal;

the processor calculates an operating bias voltage at each operating point and a half-wave voltage of the optical modulator according to the first direct current signal, and calculates an error feedback coefficient and a dither amplitude of a dither signal according to the half-wave voltage;

the output device outputs the operating bias voltage and a dither signal with the dither amplitude to the optical modulator;

the optical fiber splitter further acquires a second optical signal output upon modulation by the optical modulator according to the operating bias voltage and the dither signal, and inputs the second optical signal to the optical-electrical converter;

the optical-electrical converter converts the second optical signal into a second electrical signal;

the filter filters the second electrical signal, so as to output a harmonic component;

the digital lock-in amplifier calculates a harmonic amplitude and a shift phase of the harmonic component;

the processor calculates a new bias voltage according to the shift phase in combination with the error feedback coefficient, the operating bias voltage and the harmonic amplitude, and uses the new bias voltage as the operating bias voltage; and the output device further repeatedly outputs the operating bias voltage and the dither signal with the dither amplitude to the optical modulator.

BRIEF DESCRIPTION OF THE DRAWINGS

One or more embodiments are illustrated by way of example, and not by limitation, in the figures of the accompanying drawings, wherein elements having the same reference numeral designations represent like elements throughout. The drawings are not to scale, unless otherwise disclosed.

DETAILED DESCRIPTION

The present disclosure is further described with reference to the accompanying drawings and exemplary embodiments.

Figure 1:
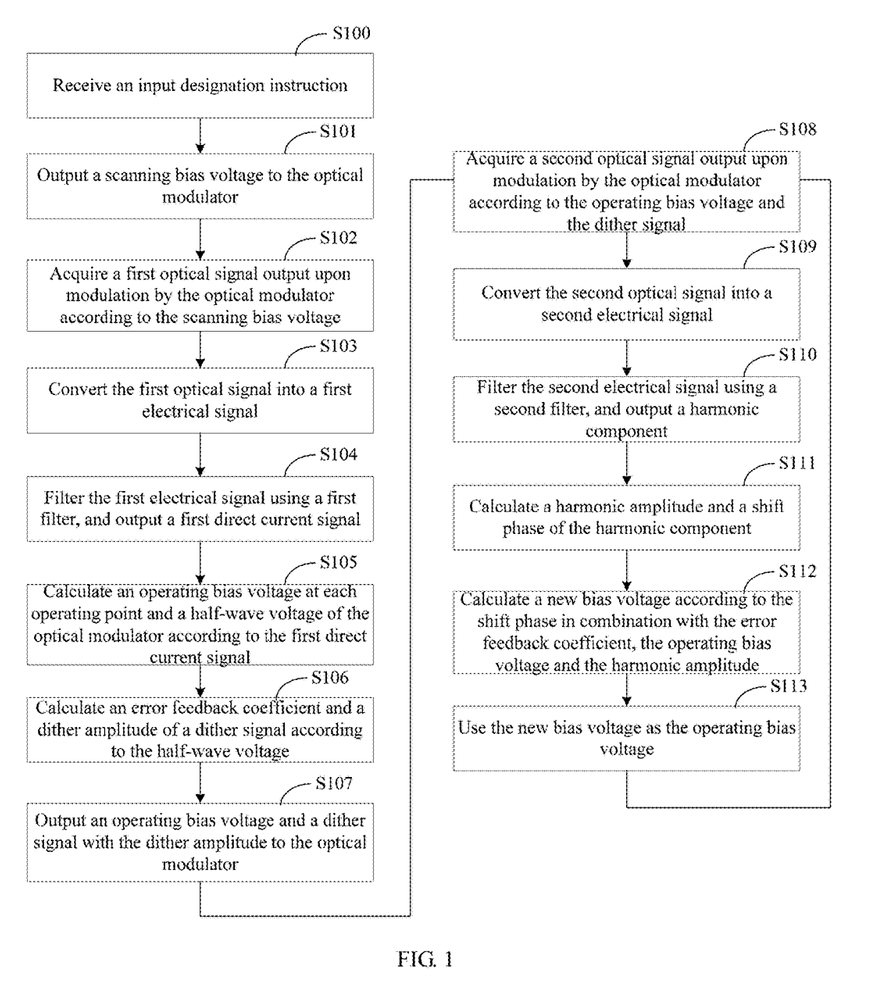
FIG. 1 is a flowchart of a method for digitally and automatically controlling a bias voltage of an electro-optic optical modulator according to an embodiment of the present disclosure.

Referring to FIG. 1, a method for digitally and automatically controlling a bias voltage of an electro-optic optical modulator includes the following steps:

Step S101: A scanning bias voltage is output to the optical modulator.

An optical carrier output by a laser and radio frequency signals output by a radio frequency signal generator are modulated by the optical modulator, and the radio frequency signals are attached on the optical carrier and thus converted into optical signals to implement optical communication.

The scanning bias voltage is output to the optical modulator, such that the optical modulator operates in a corresponding working point.

Step S102: A first optical signal output upon modulation by the optical modulator according to the scanning bias voltage is acquired.

The optical signals output upon modulation by the optical modulator may be acquired using an optical fiber splitter, and the optical fiber splitter only acquires a portion of the optical signals. Therefore, normal transmission of the optical signals is not affected.

Step S103: The first optical signal is converted into a first electrical signal.

Step S104: The first electrical signal is filtered using a first filter, and a first direct current signal is output.

Step S105: An operating bias voltage at each operating point and a half-wave voltage of the optical modulator are calculated according to the first direct current signal.

A plurality of scanning bias voltages may be used, and the first direct current signal and the scanning bias voltage are in a one-to-one corresponding relationship. Therefore, a plurality of first direct current signals may also be acquired. The number of first direct current signals is the same as the number of scanning bias voltages. After one scanning bias voltage is output to the optical modulator, one first direct current signal is acquired, and after another scanning bias voltage is output to the optical modulator, another first direct current signal is acquired, until all the scanning bias voltages are output. For example, in the interval between −10 V and 10 V, the scanning bias voltages are quickly scanned and output at an interval of 0.1V, and the scanning bias voltages are output to a bias voltage port of the optical modulator. Changes of the scanning bias voltage may cause the output of the optical modulator to change, and thus causes changes of the first direct current signals.

Figure 2:
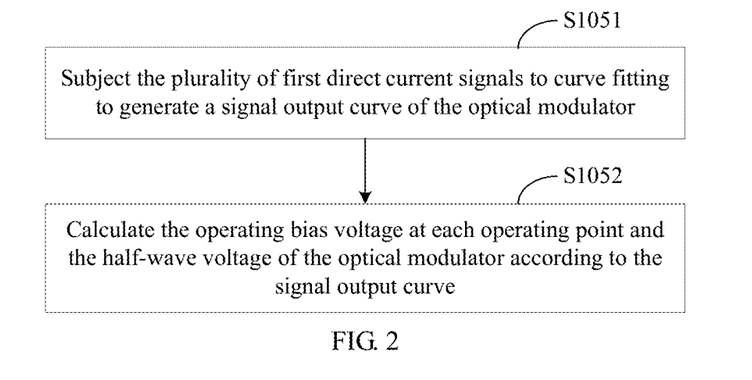
FIG. 2 is a flowchart of calculating a half-wave voltage and an operating bias voltage in the method for digitally and automatically controlling a bias voltage of an electro-optic optical modulator according to an embodiment of the present disclosure.

Since the output signals output by the optical modulator corresponding to each scanning bias voltage include different first direct current signals, the first direct current signals reflect an output curve of the optical modulator. The output curve of the optical modulator is acquired by subjecting the plurality of first direct current signals to curve fitting, and bias voltages of the optical modulator at four working points and a half-wave voltage of the optical modulator may be calculated accurately according to the output curve. Therefore, as illustrated in FIG. 2, step S105 further includes the following steps:

Step S1051: The plurality of first direct current signals is subjected to curve fitting to generate a signal output curve of the optical modulator.

Step S1052: The operating bias voltage at each operating point and the half-wave voltage of the optical modulator are calculated according to the signal output curve.

Step S106: An error feedback coefficient and a dither amplitude of a dither signal are calculated according to the half-wave voltage.

Specifically, the dither amplitude of the dither signal is one percent or one in a thousand of the half-wave voltage. The error feedback coefficient is equal to a product of the half-wave voltage and a predetermined constant.

Step S107: An operating bias voltage and a dither signal with the dither amplitude are output to the optical modulator.

The operating bias voltage controls the optical modulator to operate at a designated working point, and the dither signal detects the operating state of the optical modulator.

Step S108: A second optical signal output upon modulation by the optical modulator according to the operating bias voltage and the dither signal is acquired.

Step S109: The second optical signal is converted into a second electrical signal.

Step S110: The second electrical signal is filtered using a second filter, and a harmonic component is output.

Step S111: A harmonic amplitude and a shift phase of the harmonic component are calculated.

Specifically, a group of orthogonal sine signals and cosine signals may be pre-stored in a system. The sine signal and the dither signal have the same phase, and a difference between the cosine signal and the dither signal is 90 degrees. The harmonic component is multiplied to the sine signals and the cosine signals respectively to obtain a group of orthogonal components. The orthogonal components are filtered using a digital low-pass filter to obtain a group of orthogonal direct current components. The value of the orthogonal direct current components are the harmonic amplitudes of the harmonic components. The shift phase may be calculated according to the harmonic amplitude.

Step S112: A new bias voltage is calculated according to the shift phase in combination with the error feedback coefficient, the operating bias voltage and the harmonic amplitude.

The shift phase is used to determine a shift direction of the new bias voltage. Specifically, the value of the new bias voltage is calculated using the following formula:

$$V(t)=V(t-1)\pm p*V_{feedback}$$

$V(t)$ is the new bias voltage value, $V(t-1)$ is the operating bias voltage, p is the error feedback coefficient, $V_{feedback}$ is the harmonic amplitude of the harmonic component, and the shift phase determines whether $p*V_{feedback}$ is added to or subtracted from $V(t-1)$.

Step S113: The new bias voltage is used as the operating bias voltage, and the process returns to the step of outputting an operating bias voltage and a dither signal with the dither amplitude to the optical modulator.

During operation of the optical modulator, the operating bias voltage is adjusted, such that the output of the optical modulator is more stable, and interference caused by the ambient environment is reduced.

Figure 3:
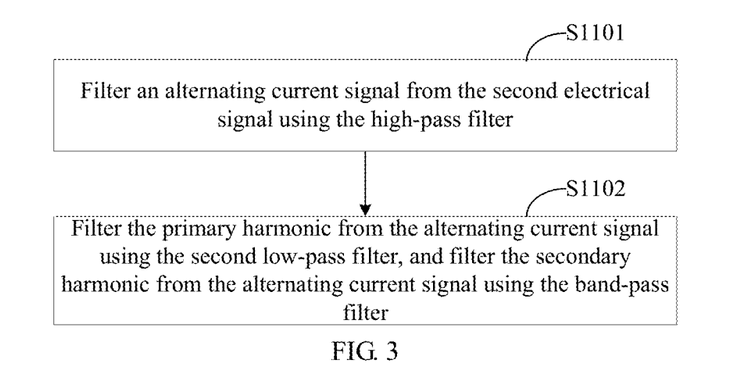
FIG. 3 is a flowchart of filtering a primary harmonic and a secondary harmonic in the method for digitally and automatically controlling a bias voltage of an electro-optic optical modulator according to an embodiment of the present disclosure.

The first filter includes a first low-pass filter, the second filter includes a second low-pass filter, a high-pass filter and a band-pass filter. The harmonic component includes a primary harmonic and a secondary harmonic. One harmonic is selected and subjected to relevant processing from the primary harmonic and the secondary harmonic according to a received designation instruction. Then step S104 may further include: filtering the first direct current signal from the first electrical signal using the first low-pass filter. As illustrated in FIG. 3, step S110 includes:

step S1101: filtering an alternating current signal from the second electrical signal using the high-pass filter; and step S1102: filtering the primary harmonic from the alternating current signal using the second low-pass filter, and filtering the secondary harmonic from the alternating current signal using the band-pass filter.

Step S111 may further include: calculating a harmonic amplitude and a shift phase of the primary harmonic, and a harmonic amplitude and a shift phase of the secondary harmonic.

Prior to step S101, the method further includes:

Step S100: An input designation instruction is received.

The designation instruction is used to instruct working points of the optical modulator. The working points include a highest point, a lowest point and two equinoctial points. The highest point and the lowest point correspond to the primary harmonic, and the two equinoctial points correspond to the secondary harmonic. The designation instruction may be generated according to an input of a user. For example, the user selects one from the available working points on a display screen to generate the designation instruction, or a location switch is provided, a working point is selected using the location switch.

Figure 4:
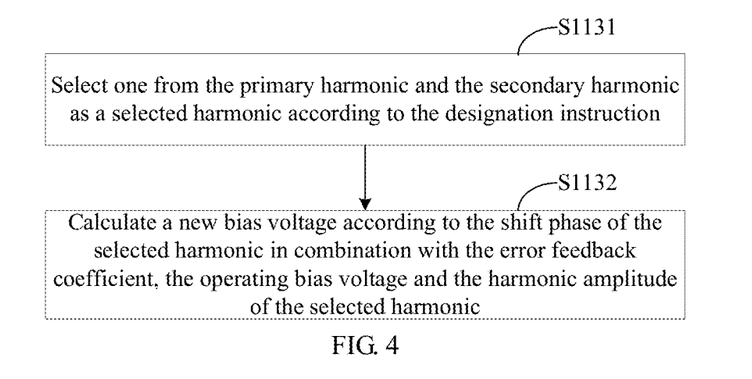
FIG. 4 is a flowchart of calculating a new bias voltage in the method for digitally and automatically controlling a bias voltage of an electro-optic optical modulator according to an embodiment of the present disclosure.

As illustrated in FIG. 4, step S113 includes:

step S1131: selecting one from the primary harmonic and the secondary harmonic as a selected harmonic according to the designation instruction; and step S1132: calculating a new bias voltage according to the shift phase of the selected harmonic in combination with the error feedback coefficient, the operating bias voltage and the harmonic amplitude of the selected harmonic.

Figure 5:
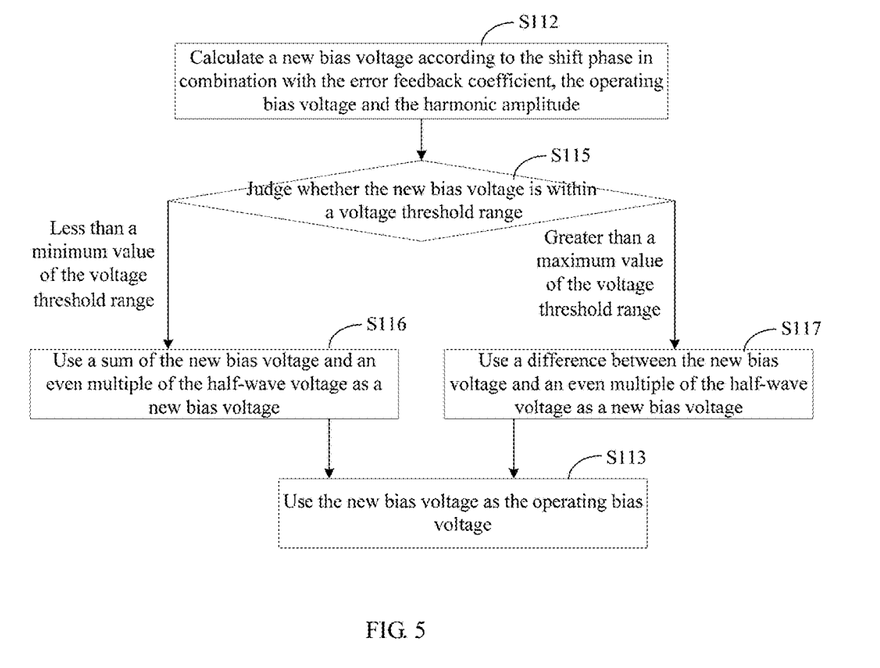
FIG. 5 is a flowchart of back-adjusting the new bias voltage in the method for digitally and automatically controlling a bias voltage of an electro-optic optical modulator according to an embodiment of the present disclosure.

To prevent an over-high or over-low new bias voltage which affecting modulation performance of the optical modulator, the calculated new bias voltage may also be detected. When the new bias voltage is over-high or over-low, the voltage is back adjusted proactively. As illustrated in FIG. 5, between step S112 and step S113, the method further includes:

step S115: judging whether the new bias voltage is within a voltage threshold range, if the new bias voltage is less than a minimum value of the voltage threshold range, performing step S116, and if the new bias voltage is greater than a maximum value of the voltage threshold range, performing step S117;

step S116: using a sum of the new bias voltage and an even multiple of the half-wave voltage as a new bias voltage, and performing step S113; and step S117: using a difference between the new bias voltage and an even multiple of the half-wave voltage as a new bias voltage, and performing step S113.

The half-wave voltage is the voltage corresponding to a half cycle of the working curve of the optical modulator, and an even multiple of the half-wave voltage is the voltage corresponding to one cycle of the working curve of the optical modulator or the voltage corresponding to a cycle multiple of the working curve of the optical modulator. Preferably, an even multiple of a wave voltage is two-fold of the half-wave voltage, and then adding or subtracting two-fold of the half-wave voltage is adding or subtracting the voltage corresponding to a cycle.

Figure 6:
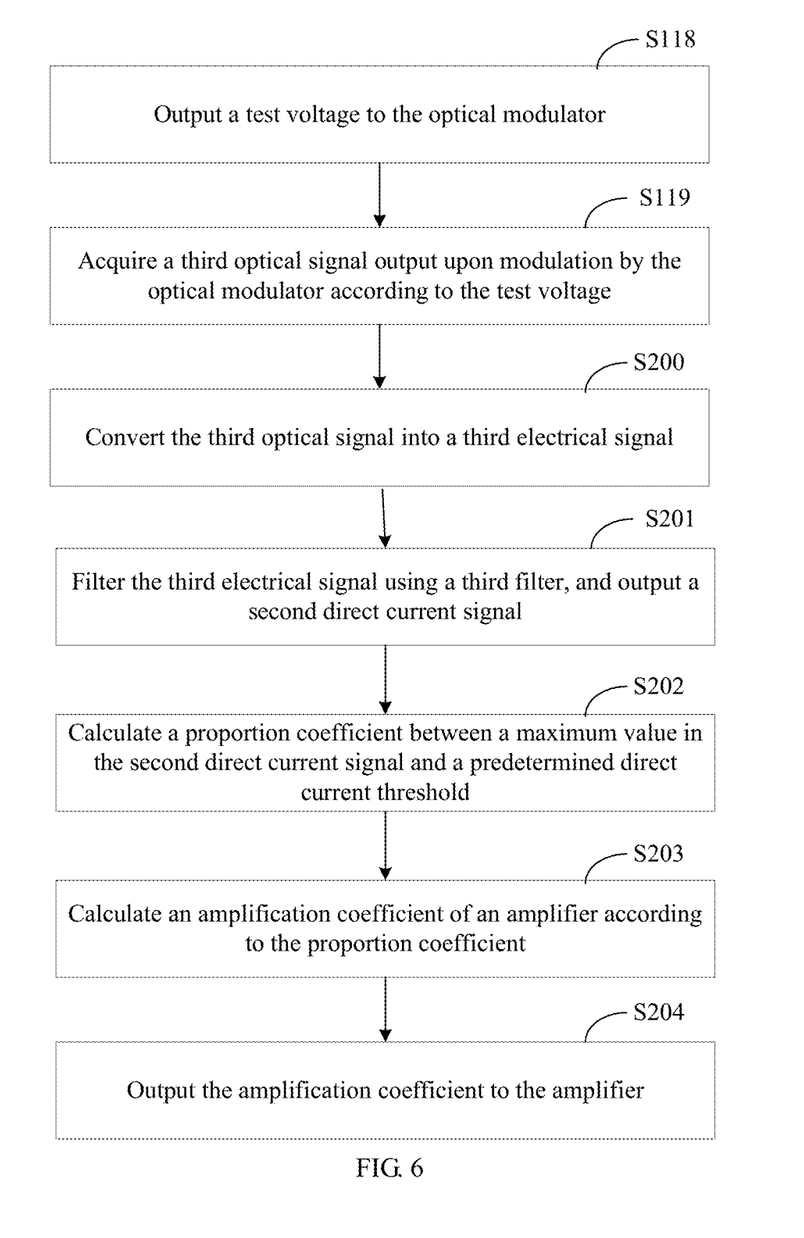
FIG. 6 is a flowchart of calculating an amplification coefficient of an amplifier in the method for digitally and automatically controlling a bias voltage of an electro-optic optical modulator according to an embodiment of the present disclosure.

To ensure that the electrical signals received by the filter are consistent and facilitate subsequent processing, when the optical signal is converted into the electrical signal, the electrical signal is amplified using an amplifier, and the electrical signals received by the filter are made consistent by adjusting the amplification coefficient of the amplifier. As illustrated in FIG. 6, prior to step S100, the method further includes the following steps:

Step S118: A test voltage is output to the optical modulator.

Preferably, the test voltage may be equal to the scanning bias voltage.

Step S119: A third optical signal output upon modulation by the optical modulator according to the test voltage is acquired.

Step S200: The third optical signal is converted into a third electrical signal.

Step S201: The third electrical signal is filtered using a third filter, and a second direct current signal is output.

Step S202: A proportion coefficient between a maximum value in the second direct current signal and a predetermined direct current threshold is calculated.

Step S203: An amplification coefficient of an amplifier is calculated according to the proportion coefficient.

Step S204: The amplification coefficient is output to the amplifier.

Step S103 may be specifically: converting the first optical signal into the first electrical signal, and amplifying the first electrical signal using the amplifier according to the amplification coefficient. Step S104 may be specifically: filtering the amplified first electrical signal using the first filter, and outputting the first direct current signal.

Step S109 may be specifically: converting the second optical signal into the second electrical signal, and amplifying the second electrical signal using the amplifier according to the amplification coefficient. Step S110 may be specifically: filtering the amplified second electrical signal using the second filter, and outputting the harmonic component.

In the embodiments of the present disclosure, after a scanning bias voltage is output to the optical modulator, a half-wave voltage of the optical modulator is calculated; an error feedback coefficient and a dither amplitude of a dither signal are calculated according to the half-wave voltage; after an operating bias voltage and a dither signal with the dither amplitude are output to the optical modulator, a harmonic amplitude and a shift phase of the harmonic component is calculated, and a new bias voltage according to the shift phase is calculated in combination with the error feedback coefficient, the operating bias voltage and the harmonic amplitude; and the new bias voltage is used as the operating bias voltage, and the step of outputting an operating bias voltage and a dither signal with the dither amplitude is performed for repeated adjustment. As such, according to the present disclosure, during operation of the optical modulator, the operating bias voltage may be constantly corrected, such that the performance of the optical modulator is more stable. In addition, whether the new bias voltage exceeds a threshold voltage range may also be judged; and if the new bias voltage exceeds the threshold voltage range, a back adjustment is made, and a new operating bias voltage is output to the optical modulator again as the operating bias voltage upon back adjustment. In this way, over-high or over-low operating bias voltages may be prevented, and stability of the optical modulator is further ensured.

Figure 7:
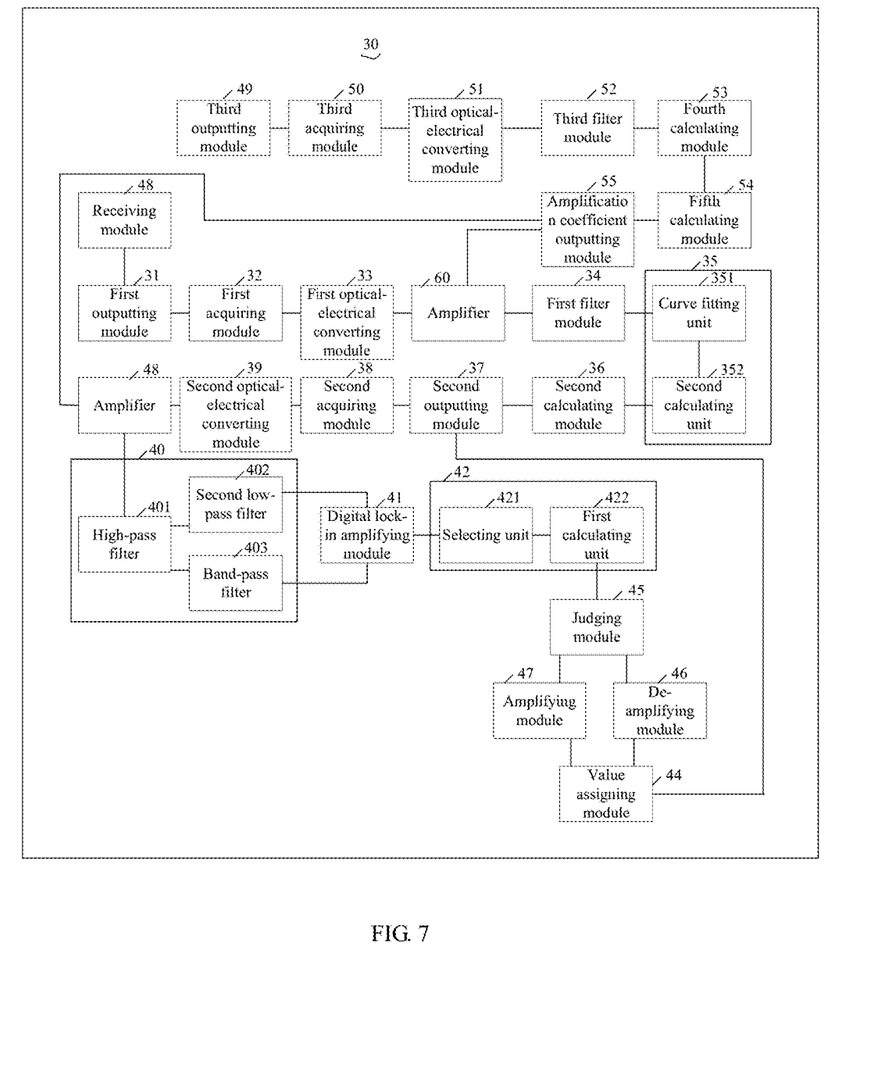
FIG. 7 is a schematic structural diagram of an apparatus for digitally and automatically controlling a bias voltage of an electro-optic optical modulator according to an embodiment of the present disclosure.

The present disclosure further provides an embodiment illustrating an apparatus for digitally and automatically controlling a bias voltage of an electro-optic optical modulator. Referring to FIG. 7, the apparatus 30 for controlling a digital automatic bias voltage includes a first outputting module 31, a first acquiring module 32, a first optical-electrical converting module 33, a first filter module 34, a first calculating module 35, a second calculating module 36, a second outputting module 37, a second acquiring module 38, a second optical-electrical converting module 39, a second filter module 40, a digital lock-in amplifying module 41, a third calculating module 42 and a value assigning module 44.

The first outputting module 31 is configured to output a scanning bias voltage to the optical modulator. The first acquiring module 32 is configured to acquire a first optical signal output upon modulation by the optical modulator according to the scanning bias voltage. The first optical-electrical converting module 33 is configured to convert the first optical signal into a first electrical signal. The first filter module 34 is configured to filter the first electrical signal using a filter, and output a first direct current signal. The first calculating module 35 is configured to calculate an operating bias voltage at each operating point and a half-wave voltage of the optical modulator according to the first direct current signal. The second calculating module 36 is configured to calculate an error feedback coefficient and a dither amplitude of a dither signal according to the half-wave voltage. The second outputting module 37 is configured to output an operating bias voltage and a dither signal with the dither amplitude to the optical modulator. The second acquiring module 38 is configured to acquire a second optical signal output upon modulation by the optical modulator according to the operating bias voltage and the dither signal. The second optical-electrical converting module 39 is configured to convert the second optical signal into a second electrical signal. The second filter module 40 is configured to filter the second electrical signal, and output a harmonic component. The digital lock-in amplifying module 41 is configured to calculate a harmonic amplitude and a shift phase of the harmonic component. The third calculating module 42 is configured to calculate a new bias voltage according to the shift phase in combination with the error feedback coefficient, the operating bias voltage and the harmonic amplitude. The value assigning module 44 is configured to use the new bias voltage as the operating bias voltage, and return to the second outputting module 37.

The harmonic component includes a primary harmonic and a secondary harmonic. The first filter module 34 includes a first low-pass filter. The second filter module 40 includes a high-pass filter 401, a second low-pass filter 402 and a band-pass filter 403. The first low-pass filter is configured to filter the first direct current signal from the first electrical signal. The high-pass filter 401 is configured to filter an alternating current signal from the second electrical signal. The second low-pass filter 402 is configured to filter a primary harmonic from the alternating current signal. The band-pass filter 403 is configured to filter a secondary harmonic from the alternating current signal. The digital lock-in amplifying module 41 is specifically configured to respectively calculate a harmonic amplitude and a shift phase of the primary harmonic, and a harmonic amplitude and a shift phase of the secondary harmonic. The apparatus 30 further includes a receiving module 48. The receiving module 48 is configured to receive an input designation instruction. The third calculating module 42 includes a selecting module 421 and a first calculating unit 422. The selecting unit 421 is configured to select one from the primary harmonic and the secondary harmonic as a selected harmonic according to the designation instruction. The first calculating unit 422 is configured to calculate a new bias voltage according to the shift phase of the selected harmonic in combination with the error feedback coefficient, the operating bias voltage and the harmonic amplitude of the selected harmonic.

A plurality of first direct current signals and a plurality of scanning bias voltages may be used, and the first direct current signals and the scanning bias voltages are in a one-to-one corresponding relationship. The scanning bias voltages are input to the optical modulator one by one. For example, in the interval between 0 V and 10 V, the scanning bias voltages are quickly scanned and output at an interval of 0.1 V, and the scanning bias voltages are output to a bias voltage port of the optical modulator. Changes of the scanning bias voltage may cause the output of the optical modulator to change, and thus causes changes of the first direct current signals. In this case, the number of first direct current signals is 100. The first calculating module 35 includes a curve fitting unit 352 and a second calculating unit 352. The curve fitting unit 351 is configured to subject the plurality of first direct current signals to curve fitting to generate a signal output curve of the optical modulator. The second calculating unit 352 is configured to calculate the operating bias voltage at each operating point and the half-wave voltage of the optical modulator according to the signal output curve.

To prevent over-high or over-low new bias voltages, and prevent impacts caused to the modulation performance of the optical modulator, the new operating bias voltage obtained via calculation may be detected. When the new operating bias voltage is over-high or over-low, a back adjustment is made. In this case, the apparatus 30 further includes a judging module 45, a de-amplifying module 46 and an amplifying module 47. The judging module 45 is configured to judge whether the new bias voltage is within a voltage threshold range. The amplifying module 47 is configured to use a sum of the new bias voltage and an even multiple of the half-wave voltage as a new bias voltage, and execute the value assigning module 44, if the judging module 45 judges that the new bias voltage is less than a minimum value of the voltage threshold range. The de-amplifying module 46 is configured to use a difference between the new bias voltage and an even multiple of the half-wave voltage as a new bias voltage, and execute the value assigning module 44, if the judging module 45 judges that the new bias voltage is greater than a maximum value of the voltage threshold range.

To ensure that the electrical signals received by the filter are consistent and facilitate subsequent processing, the apparatus further includes an amplifier 60, wherein the amplifier 60 is configured to amplify the electrical signal according to an amplification coefficient. Nevertheless, before the bias voltage of the optical modulator is modulated, the amplification coefficient of the amplifier 60 may be firstly adjusted. The apparatus 30 further includes: a third outputting module 49, a third acquiring module 50, a third optical-electrical converting module 51, a third filter module 52, a fourth calculating module 53, a fifth calculating module 54 and an amplification coefficient outputting module 55.

The third outputting module 49 is configured to output a test voltage to the optical modulator. The third acquiring module 50 is configured to acquire a third optical signal output upon modulation by the optical modulator according to the test voltage. The third optical-electrical converting module 51 is configured to convert the third optical signal into a third electrical signal. The third filtering module 52 is configured to filter the third electrical signal, and output a second direct current signal. The fourth calculating module 53 is configured to calculate a proportion coefficient between a maximum value in the second direct current signal and a predetermined direct current threshold. The fifth calculating module 54 is configured to calculate an amplification coefficient of the amplifier according to the proportion coefficient. The amplification coefficient outputting module 55 is configured to output the amplification coefficient to the amplifier 60. The amplifier 60 is configured to amplify the first electrical signal and the second electrical signal according to the amplification coefficient.

Figure 8:
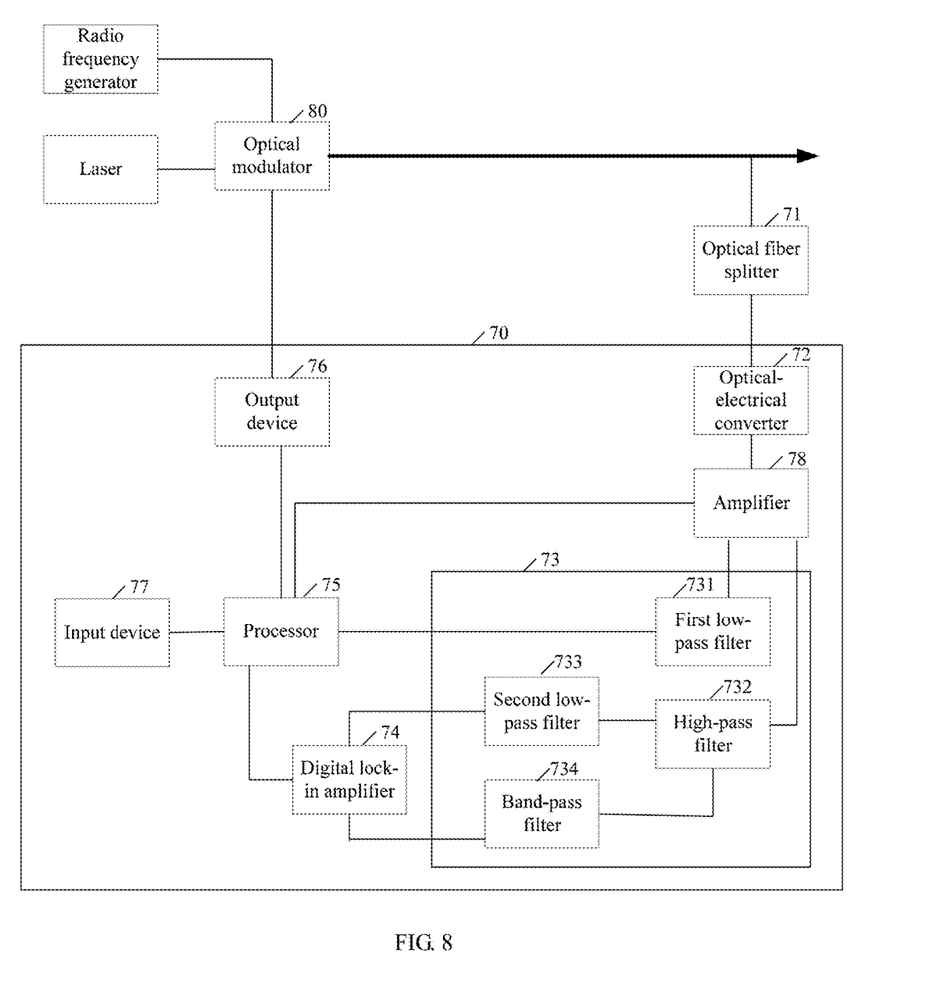
FIG. 8 is a schematic structural diagram of an apparatus for digitally and automatically controlling a bias voltage of an electro-optic optical modulator according to another embodiment of the present disclosure.

The present disclosure further provides an embodiment illustrating an entity structure of the apparatus for digitally and automatically controlling a bias voltage of an electro-optic optical modulator. As illustrated in FIG. 8, an apparatus 70 for controlling a digital automatic bias voltage of an electro-optic optical modulator includes an optical-electrical converter 72, a filter 73, a digital lock-in amplifier 74, a processor 75 and an output device 76.

The output device 76 inputs a scanning bias voltage to an optical modulator 80. An optical fiber splitter 71 acquires a first optical signal output upon modulation by the optical modulator 80 according to the scanning bias voltage, and inputs the first optical signal to the optical-electrical converter 72. The optical-electrical converter 72 converts the first optical signal into a first electrical signal. The filter 73 filters the first electrical signal, and outputs a first direct current signal. The processor 75 calculates an operating bias voltage at each operating point and a half-wave voltage of the optical modulator according to the first direct current signal, and calculates an error feedback coefficient and a dither amplitude of a dither signal according to the half-wave voltage. The output device 76 outputs the operating bias voltage and a dither signal with the dither amplitude to the optical modulator 80. The optical fiber splitter 71 further acquires a second optical signal output upon modulation by the optical modulator 80 according to the operating bias voltage and the dither signal, and inputs the second optical signal to the optical-electrical converter 72. The optical-electrical converter 72 converts the second optical signal into a second electrical signal. The filter 73 filters the second electrical signal, and outputs a harmonic component. The digital lock-in amplifier 74 calculates a harmonic amplitude and a shift phase of the harmonic component. The processor 75 calculates a new bias voltage according to the shift phase in combination with the error feedback coefficient, the operating bias voltage and the harmonic amplitude, and uses the new bias voltage as the operating bias voltage. The output device 76 further repeatedly outputs the operating bias voltage and the dither signal with the dither amplitude to the optical modulator, such that the apparatus 70 for controlling an automatic bias voltage is capable of constantly correcting the operating bias voltage of the optical modulator. In this way, the operating performance of the optical modulator becomes more stable.

The harmonic component includes a primary harmonic and a secondary harmonic. The filter 73 includes a first low-pass filter 731, a second low-pass filter 733, a high-pass filter 732 and a band-pass filter 734. The first low-pass filter 731 filters the first direct current signal from the first electrical signal. The high-pass filter 732 filters an alternating current signal from the second electrical signal. The apparatus 70 further includes an input device 77.

The second low-pass filter 733 filters a primary harmonic from the alternating current signal. The band-pass filter 734 filters a secondary harmonic from the alternating current signal. The step in which the digital lock-in amplifier 74 calculates the harmonic amplitude and the shift phase of the harmonic component includes: calculating, by the digital lock-in amplifier 74, a harmonic amplitude and a shift phase of the primary harmonic, and a harmonic amplitude and a shift phase of the secondary harmonic. It should be noted that the digital lock-in amplifier 74 may be an independent device, or may be a program module in the processor 75. That is, the operations performed by the digital lock-in amplifier 74 are performed by the processor 75.

The input device 77 receives an input designation instruction. The step in which the processor 75 calculates the new bias voltage according to the shift phase in combination with the error feedback coefficient, the operating bias voltage and the harmonic amplitude includes: selecting, by the processor 75, one from the primary harmonic and the secondary harmonic as a selected harmonic according to the designation instruction, and calculating a new bias voltage according to the shift phase of the selected harmonic in combination with the error feedback coefficient, the operating bias voltage and the harmonic amplitude of the selected harmonic.

A plurality of first direct current signals and a plurality of scanning bias voltages are used, and the scanning bias voltages and the first direct current signals are in a one-to-one corresponding relationship.

The step in which the processor 75 calculates the operating bias voltage at each operating point and the half-wave voltage of the optical modulator according to the first direct current signal includes: subjecting, by the processor 75, the plurality of first direct current signals to curve fitting to generate a signal output curve of the optical modulator, and calculating the operating bias voltage at each operating point and the half-wave voltage at of the optical modulator according to the signal output curve.

To prevent over-high or over-low new bias voltages, the new bias voltages may be detected. In this case, after the step in which the processor 75 calculates the new bias voltage according to the shift phase of the selected harmonic in combination with the error feedback coefficient, the operating bias voltage and the harmonic amplitude of the selected harmonic, the processor 75 judges whether the new bias voltage is within a voltage threshold range. If the new bias voltage is less than a minimum value of the voltage threshold range, the processor 75 uses a sum of the new bias voltage and an even multiple of the half-wave voltage as a new bias voltage. If the new bias voltage is greater than a maximum value of the voltage threshold range, the processor 75 uses a difference between the new bias voltage and an even multiple of the half-wave voltage as a new bias voltage.

To ensure that the electrical signals received by the filter are consistent and facilitate subsequent processing, when the optical signal is converted into the electrical signal, the electrical signal may be amplified using an amplifier, and the electrical signals received by the filter may be made consistent by adjusting the amplification coefficient of the amplifier. In this case, the apparatus 70 further includes an amplifier 78.

Before the operating bias voltage of the optical modulator 80 is calculated, the amplification coefficient of the amplifier 78 is firstly adjusted. Prior to the step in which the output device 76 outputs the scanning bias voltage to the optical modulator, the output device 76 further outputs a test voltage to the optical modulator 80. The optical fiber splitter 71 acquires a third optical signal output upon modulation by the optical modulator according to the test voltage. The optical-electrical converter 72 converts the third optical signal into a third electrical signal. The first low-pass filter 731 filters the third electrical signal, and outputs a second direct current signal. The processor 75 calculates a proportion coefficient between a maximum value in the second direct current signal and a predetermined direct current threshold, calculates an amplification coefficient of the amplifier 78 according to the proportion coefficient and outputs the amplification coefficient to the amplifier 78. After the optical-electrical converter 72 converts the first optical signal into the first electrical signal, and converts the second optical signal into the second electrical signal, the amplifier 78 amplifies the first electrical signal and the second electrical signal according to the amplification coefficient, and the filter 73 processes the amplified first electrical signal and second electrical signal.

In the embodiments of the present disclosure, after a scanning bias voltage is output to the optical modulator, a half-wave voltage of the optical modulator is calculated; an error feedback coefficient and a dither amplitude of a dither signal are calculated according to the half-wave voltage; after an operating bias voltage and a dither signal with the dither amplitude are output to the optical modulator, a harmonic amplitude and a shift phase of the harmonic component is calculated, and a new bias voltage according to the shift phase is calculated in combination with the error feedback coefficient, the operating bias voltage and the harmonic amplitude; and the new bias voltage is used as the operating bias voltage, and the step of outputting an operating bias voltage and a dither signal with the dither amplitude is performed for repeated adjustment. As such, according to the present disclosure, during operation of the optical modulator, the operating bias voltage may be constantly corrected, such that the operating performance of the optical modulator is more stable. In addition, whether the new bias voltage exceeds a threshold voltage range may also be judged; and if the new bias voltage exceeds the threshold voltage range, a back adjustment is made, and a new operating bias voltage is output to the optical modulator again as the operating bias voltage upon back adjustment. In this way, over-high or over-low operating bias voltages may be prevented, and stability of the optical modulator is further ensured.

Described above are exemplary embodiments of the present disclosure, but are not intended to limit the scope of the present disclosure. Any equivalent structure or equivalent process variation made based on the specification and drawings of the present disclosure, which is directly or indirectly applied in other related technical fields, fall within the scope of the present disclosure.

What is claimed is:

1. A method for digitally and automatically controlling a bias voltage of an electro-optic optical modulator, comprising:

outputting a scanning bias voltage to an optical modulator;
acquiring a first optical signal output upon modulation by the optical modulator according to the scanning bias voltage;
converting the first optical signal into a first electrical signal;
filtering the first electrical signal using a first filter, so as to output a first direct current signal;
calculating an operating bias voltage at each operating point and a half-wave voltage of the optical modulator according to the first direct current signal;
calculating an error feedback coefficient and a dither amplitude of a dither signal according to the half-wave voltage;
outputting the operating bias voltage and the dither signal with the dither amplitude to the optical modulator;
acquiring a second optical signal output upon modulation by the optical modulator according to the operating bias voltage and the dither signal;
converting the second optical signal into a second electrical signal;
filtering the second electrical signal using a second filter, so as to output a harmonic component;
calculating a harmonic amplitude and a shift phase of the harmonic component;
calculating a new bias voltage according to the shift phase in combination with the error feedback coefficient, the operating bias voltage and the harmonic amplitude; and
using the new bias voltage as the operating bias voltage, and returning to the outputting a new operating bias voltage and a new dither signal with the dither amplitude to the optical modulator.

2. The method according to claim 1, wherein
the harmonic component comprises a primary harmonic and a secondary harmonic;
the first filter comprises a first low-pass filter, the second filter comprises a second low-pass filter, a high-pass filter and a band-pass filter;
filtering the first electrical signal using the first filter, so as to output the first direct current signal comprises:
filtering the first direct current signal from the first electrical signal using the first low-pass filter;
the filtering of the second electrical signal using a second filter, so as to output the harmonic component comprises:
filtering an alternating current signal from the second electrical signal using the high-pass filter; and
filtering the primary harmonic from the alternating current signal using the second low-pass filter, and filtering the secondary harmonic from the alternating current signal using the band-pass filter;
calculating the harmonic amplitude and the shift phase of the harmonic component comprises:
calculating the harmonic amplitude and the shift phase of the primary harmonic, and the harmonic amplitude and the shift phase of the secondary harmonic;
prior to the outputting of the scanning bias voltage to the optical modulator, the method further comprises:
receiving an input designation instruction; and
calculating the new bias voltage according to the shift phase in combination with the error feedback coefficient, the operating bias voltage and the harmonic amplitude comprises:
selecting one from the primary harmonic and the secondary harmonic as a selected harmonic according to the input designation instruction; and
calculating the new bias voltage according to the shift phase of the selected harmonic in combination with the error feedback coefficient, the operating bias voltage and the harmonic amplitude of the selected harmonic.

3. The method according to claim 1, wherein
a plurality of first direct current signals and a plurality of scanning bias voltages are used, and the plurality of scanning bias voltages and the plurality of first direct current signals are in a one-to-one corresponding relationship; and
calculating the operating bias voltage at each operating point and a half-wave voltage the optical modulator according to the first direct current signal comprises:
subjecting the plurality of first direct current signals to curve fitting to generate a signal output curve of the optical modulator; and
calculating the operating bias voltage at each operating point and the half-wave voltage of the optical modulator according to the signal output curve.

4. The method according to claim 1, wherein
after calculating the new bias voltage according to the shift phase in combination with the error feedback coefficient, the operating bias voltage and the harmonic amplitude, the method further comprises:
judging whether the new bias voltage is within a voltage threshold range;
if the new bias voltage is less than a minimum value of the voltage threshold range, using a sum of the new bias voltage and an even multiple of the half-wave voltage as the new bias voltage, and performing using the new bias voltage as the operating bias voltage; or
if the new bias voltage is greater than a maximum value of the voltage threshold range, using a difference between the new bias voltage and an even multiple of the half-wave voltage as the new bias voltage, and performing using the new bias voltage as the operating bias voltage.

5. The method according to claim 1, wherein
prior to the outputting of the scanning bias voltage to the optical modulator, the method further comprises:
outputting a test voltage to the optical modulator;
acquiring a third optical signal output upon modulation by the optical modulator according to the test voltage;
converting the third optical signal into a third electrical signal;
filtering the third electrical signal using a third filter, so as to output a second direct current signal;
calculating a proportion coefficient between a maximum value in the second direct current signal and a predetermined direct current threshold;
calculating an amplification coefficient of an amplifier according to the proportion coefficient;
outputting the amplification coefficient to the amplifier;
converting the first optical signal into the first electrical signal comprises converting the first optical signal into the first electrical signal, and amplifying the first electrical signal using the amplifier according to the amplification coefficient;
filtering the first electrical signal using the first filter, so as to output the first direct current signal comprises:

filtering the amplified first electrical signal using the first filter, so as to output the first direct current signal;

converting the second optical signal into the second electrical signal comprises converting the second optical signal into the second electrical signal, and amplifying the second electrical signal using the amplifier according to the amplification coefficient; and filtering the second electrical signal using the second filter, so as to output the harmonic component comprises:

filtering the amplified second electrical signal using the second filter, so as to output a harmonic component.

6. An apparatus for digitally and automatically controlling a bias voltage of an electro-optic optical modulator, comprising: an optical-electrical converter, a filter, a digital lock-in amplifier, a processor, and an output device; wherein the output device inputs a scanning bias voltage to the electro-optic optical modulator; an optical fiber splitter acquires a first optical signal output upon modulation by the electro-optic optical modulator according to the scanning bias voltage, and inputs the first optical signal to the optical-electrical converter;

the optical-electrical converter converts the first optical signal into a first electrical signal;

the filter filters the first electrical signal, so as to output a first direct current signal;

the processor calculates an operating bias voltage at each operating point and a half-wave voltage of the optical modulator according to the first direct current signal, and calculates an error feedback coefficient and a dither amplitude of the dither signal according to the half-wave voltage;

the output device outputs the operating bias voltage and a dither signal with the dither amplitude to the optical modulator;

the optical fiber splitter further acquires a second optical signal output upon modulation by the electro-optic optical modulator according to the operating bias voltage and the dither signal, and inputs the second optical signal to the optical-electrical converter;

the optical-electrical converter converts the second optical signal into a second electrical signal;

the filter filters the second electrical signal, so as to output a harmonic component;

the digital lock-in amplifier calculates a harmonic amplitude and a shift phase of the harmonic component;

the processor calculates a new bias voltage according to the shift phase in combination with the error feedback coefficient, the operating bias voltage and the harmonic amplitude, and uses the new bias voltage as the operating bias voltage; and the output device further repeatedly outputs the operating bias voltage and the dither signal with the dither amplitude to the electro-optic optical modulator.

7. The apparatus according to claim 6, wherein the harmonic component comprises a primary harmonic and a secondary harmonic;

the filter comprises a first low-pass filter, a second low-pass filter, a high-pass filter and a band-pass filter;

the first low-pass filter filters the first direct current signal from the first electrical signal;

the high-pass filter filters an alternating current signal from the second electrical signal;

the second low-pass filter filters the primary harmonic from the alternating current signal;

the band-pass filter filters the secondary harmonic from the alternating current signal;

the digital lock-in amplifier calculating the harmonic amplitude and the shift phase of the harmonic component comprises: calculating, by the digital lock-in amplifier, the harmonic amplitude and the shift phase of the primary harmonic, and the harmonic amplitude and the shift phase of the secondary harmonic;

the apparatus further comprises an input device;

the input device receives an input designation instruction;

the processor calculating the new bias voltage according to the shift phase in combination with the error feedback coefficient, the operating bias voltage and the harmonic amplitude comprises: selecting, by the processor, one from the primary harmonic and the secondary harmonic as a selected harmonic according to the input designation instruction, and calculating the new bias voltage according to the shift phase of the selected harmonic in combination with the error feedback coefficient, the operating bias voltage and the harmonic amplitude of the selected harmonic.

8. The apparatus according to claim 6, wherein a plurality of first direct current signals and a plurality of scanning bias voltages are used, and the scanning bias voltages and the first direct current signals are in a one-to-one corresponding relationship;

the processor calculating the operating bias voltage at each operating point and the half-wave voltage of the electro-optic optical modulator according to the first direct current signal comprises:

subjecting, by the processor, the plurality of first direct current signals to curve fitting to generate a signal output curve of the electro-optic optical modulator, and calculating the operating bias voltage at each operating point and the half-wave voltage at of the electro-optic optical modulator according to the signal output curve.

9. The apparatus according to claim 6, further comprising:

after the processor calculating the new bias voltage according to the shift phase of the selected harmonic in combination with the error feedback coefficient, the operating bias voltage and the harmonic amplitude of the selected harmonic, the processor judges whether the new bias voltage is within a voltage threshold range;

if the new bias voltage is less than a minimum value of the voltage threshold range, the processor uses a sum of the new bias voltage and an even multiple of the half-wave voltage as the new bias voltage;

if the new bias voltage is greater than a maximum value of the voltage threshold range, the processor uses a difference between the new bias voltage and the even multiple of the half-wave voltage as the new bias voltage.

10. The apparatus according to claim 6, further comprising:

the apparatus further comprises an amplifier;

prior to the output device outputting the scanning bias voltage to the electro-optic optical modulator, the output device further outputs a test voltage to the electro-optic optical modulator;

the optical fiber splitter acquires a third optical signal output upon modulation by the optical modulator according to the test voltage;

the optical-electrical converter converts the third optical signal into a third electrical signal;

the first low-pass filter filters the third electrical signal, so as to outputs a second direct current signal;

the processor calculates a proportion coefficient between a maximum value in the second direct current signal and a predetermined direct current threshold, calculates an amplification coefficient of the amplifier according to the proportion coefficient and outputs the amplification coefficient to the amplifier; and after the optical-electrical converter converting the first optical signal into the first electrical signal, and converting the second optical signal into the second electrical signal, the amplifier amplifies the first electrical signal and the second electrical signal according to the amplification coefficient.

* * * * *